US012647004B2

(12) United States Patent
Kolehmainen

(10) Patent No.: US 12,647,004 B2
(45) Date of Patent: Jun. 2, 2026

(54) METHOD FOR MANUFACTURING A STATOR FOR AN AXIAL FLUX ELECTRIC MACHINE

(71) Applicant: RENAULT S.A.S., Boulogne Billancourt (FR)

(72) Inventor: Jere Kolehmainen, Saint-Aubin-les-Elbeuf (FR)

(73) Assignee: AMPERE S.A.S., Boulogne Billancourt (FR)

( * ) Notice: Subject to any disclaimer, the term of this patent is extended or adjusted under 35 U.S.C. 154(b) by 692 days.

(21) Appl. No.: 18/246,551

(22) PCT Filed: Aug. 4, 2021

(86) PCT No.: PCT/EP2021/071722
§ 371 (c)(1),
(2) Date: Apr. 19, 2023

(87) PCT Pub. No.: WO2022/063469
PCT Pub. Date: Mar. 31, 2022

(65) Prior Publication Data
US 2023/0361659 A1      Nov. 9, 2023

(30) Foreign Application Priority Data

Sep. 24, 2020    (FR) ...................................... 20 09726

(51) Int. Cl.
*H02K 15/02*          (2025.01)
*H02K 1/20*           (2006.01)

(52) U.S. Cl.
CPC ............... *H02K 15/02* (2013.01); *H02K 1/20* (2013.01); *H02K 2215/00* (2021.08)

(58) Field of Classification Search
CPC ...... H02K 15/02; H02K 1/20; H02K 2215/00; H02K 21/24; H02K 15/022;
(Continued)

(56) References Cited

U.S. PATENT DOCUMENTS 5,365,132 A * 11/1994 Hann ........................ H02K 7/14
                                                              174/DIG. 20
9,006,953 B2     4/2015 Wei et al.
(Continued)

FOREIGN PATENT DOCUMENTS

CN          109510341 A       3/2019
FR           2999359 A1 *    6/2014 ............... H02K 5/20

OTHER PUBLICATIONS

International Search Report issued Nov. 4, 2021 in PCT/EP2021/071722, filed on Aug. 4, 2021, 2 pages.
(Continued)

*Primary Examiner* — Donghai D Nguyen
(74) *Attorney, Agent, or Firm* — Oblon, McClelland, Maier & Neustadt, L.L.P.

(57)                ABSTRACT
A method for manufacturing a stator of an axial flow electric machine includes cutting slots on a lateral part of a strip of sheet metal, cutting recesses on an opposite lateral part of the strip to form coolant flow channels, winding the strip according to a radial stack, the recesses being cut by a double perforation symmetrical to a line orthogonal to the length of the strip, the recesses being cut on a first radial periphery of the stator winding at a distance from the radial section of the stator passing through the line, until they meet on the radial section at an opposite radial periphery of the stator winding, forming V-shaped channels meeting at the ends of the legs of the V's during the winding.

7 Claims, 7 Drawing Sheets

Figures 1, 2A:
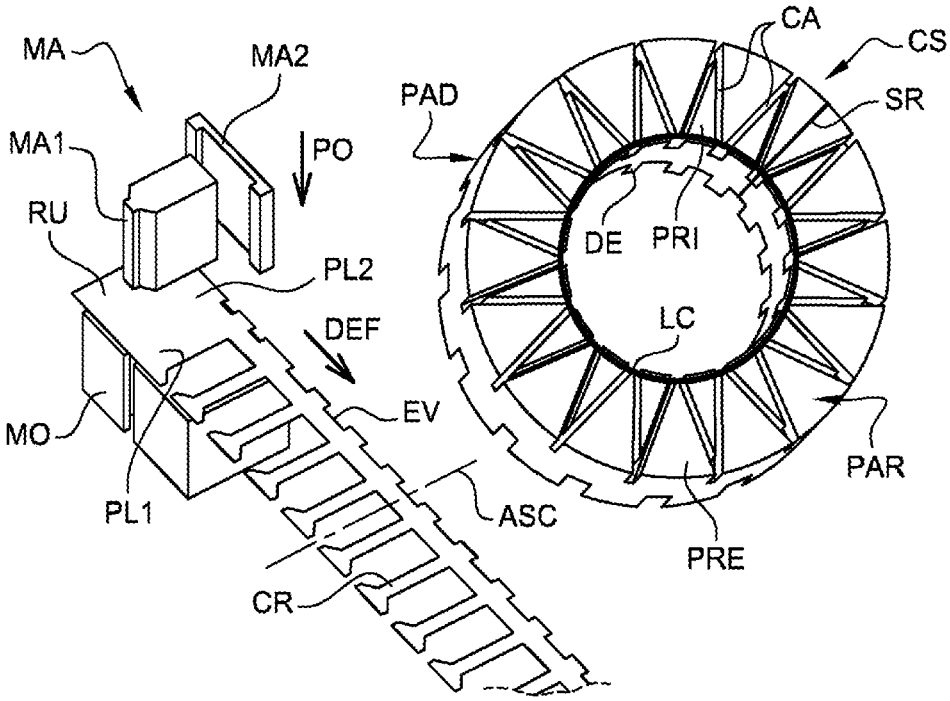

(58) Field of Classification Search
CPC ......... Y10T 29/49009; Y10T 29/49071; Y10T
29/49073; Y10T 29/53143
See application file for complete search history.

(56) References Cited

U.S. PATENT DOCUMENTS

| | | | |
|---|---|---|---|
| 9,935,503 B2 * | 4/2018 | Cohen ....................... | F28F 7/00 |
| 2005/0067905 A1 * | 3/2005 | Maney .................... | H02K 1/20 |
| | | | 310/58 |
| 2013/0140920 A1 | 6/2013 | Wei et al. | |

OTHER PUBLICATIONS

French Preliminary Search Report issued Jun. 7, 2021 in French Application 20 09726, filed on Sep. 24, 2020, 3 pages (with English translation of categories of Cited Documents).

* cited by examiner

| Perforate strip | E1 |
| Cut slots | E11 |
| Cut recesses | E12 |

Wind strip — E2

Axially close channels — E3

Apply seal — E4

METHOD FOR MANUFACTURING A STATOR FOR AN AXIAL FLUX ELECTRIC MACHINE

The present invention relates generally to the fields of electrotechnics and mechanics and relates more specifically to the manufacture of a stator for an axial flux electric machine.

A stator for an electric machine comprises teeth, generally made of magnetic steel, around which copper wires are wound. When the electric machine is in operation, the copper wires produce heat by the Joule effect, which has to be discharged. In addition, the magnetic flux generates eddy currents in the steel structure of the stator and hysteresis losses, which also have to be discharged.

A stator for an axial flux electric machine is generally cooled using a cooling plate coupled to the yoke of the stator, more specifically to the annular planar portion of the steel structure of the stator, in the direction away from the toothed portion of the stator. This cooling plate comprises channels allowing a coolant, for example oil, to be circulated. However, the addition of a specific structure for the cooling adds to the footprint and material costs for the machine produced. In addition, it is difficult to guarantee good surface contact and good thermal conduction between the cooling plate and the yoke of the stator.

Document FR2999359 proposes incorporating this cooling structure into the casing of the electric machine. However, this solution is complex to implement and does not guarantee good thermal conduction between the cooling channels and the stator yoke either.

Document U.S. Pat. No. 9,006,953 proposes a stator for an axial flux electric machine, said stator being manufactured by winding of metal sheets in which recesses are provided so as to form radial through-channels. A pipe passing through these recesses and notably at the internal radial periphery of the stator is required to form a cooling circuit of the stator. As a consequence, the thermal conduction between the pipe and the metal sheets is not optimal, and, in addition, the footprint of the pipe at the internal periphery of the stator is not desirable. The assembly of such a stator and the costs thereof are not optimal.

One of the aims of the invention is to remedy at least some of the drawbacks of the prior art by providing a method for manufacturing a stator for an axial flux electric machine, allowing satisfactory cooling of the stator, in a rapid and inexpensive manner.

To this end, the invention proposes a method for manufacturing a stator for an axial flux electric machine, comprising the steps of:

perforating a magnetic metal sheet strip, said perforation step comprising:

cutting material on a first lateral part of the strip, leaving slots on said strip that are intended to form stator teeth, cutting recesses on a second lateral part of the strip, opposite to said first lateral part of the strip, that are intended to form coolant circulation channels, winding said metal sheet strip according to a radial stack, characterized in that during the cutting of material between two slots of said strip, the cutting of the recesses is effected by a double perforation symmetrically with respect to a line parallel to the axis of axial symmetry comprised between said two slots, the recesses being cut so as to be positioned on either side of the radial section of the wound stator passing through said line, so as to be spaced apart from one another from a first radial peripheral part of said stator until they meet on said radial section at the second radial peripheral part of said stator that is opposite to said first radial peripheral part, thus forming said channels, said channels being in the form of a V and meeting at the ends of the branches of the V during said winding step.

By virtue of the invention, the cooling channels of the stator form a zigzag-shaped circuit at the axial periphery of the stator opposite to the toothed axial periphery of the stator. The coolant, such as oil, may therefore circulate in this circuit directly on the stator metal sheets, thus increasing the effectiveness of the cooling with respect to the prior art. The absence of any additional pipes for circulating oil in the stator limits the footprint of the cooling system. In addition, the channels are advantageously produced as rapidly as in the prior art U.S. Pat. No. 9,006,953, since in the invention, preferably, the perforation of the recesses forming these channels and the perforation of the slots is also effected as a single operation.

According to an advantageous feature of the method according to the invention, said channels are open, at the branches of the V and/or at the point of the V, on said first or said second radial peripheral part of said stator.

This feature makes it possible to have the same cut for all the teeth of the stator, this being easier to implement than opening, at the first or the second radial periphery of the stator, only the channels which open out at an inlet or an outlet of the coolant circuit acting as the interface between the stator and a heat exchanger.

According to another advantageous feature of the invention, said first radial peripheral part of said stator is an internal peripheral part of said stator, said second radial peripheral part of said stator being an external peripheral part of said stator.

This embodiment of the invention is simpler than that in which the branches of the V point toward the external radial periphery of the stator.

According to yet another advantageous feature of the invention, said parallel line corresponds to the axis of axial symmetry comprised between said two slots. Thus, this axis of axial symmetry may serve as a reference for the perforation of the recesses, which is then easier to control.

Advantageously, when said channels open out at at least one of the radial peripheries of the stator, the method for manufacturing the stator according to the invention further comprises a step of applying a seal to said first radial peripheral part and/or to said second radial peripheral part of the stator, at those openings of said channels which do not serve as inlet or outlet for said coolant.

Further advantageously, when said recesses open out at an axial periphery of said stator, the method for manufacturing a stator according to the invention further comprises a step of closing said channels at said axial periphery by fastening an annular plate to said axial periphery.

Lastly, the invention also relates to a stator manufactured by the method according to the invention.

Figure 2B:
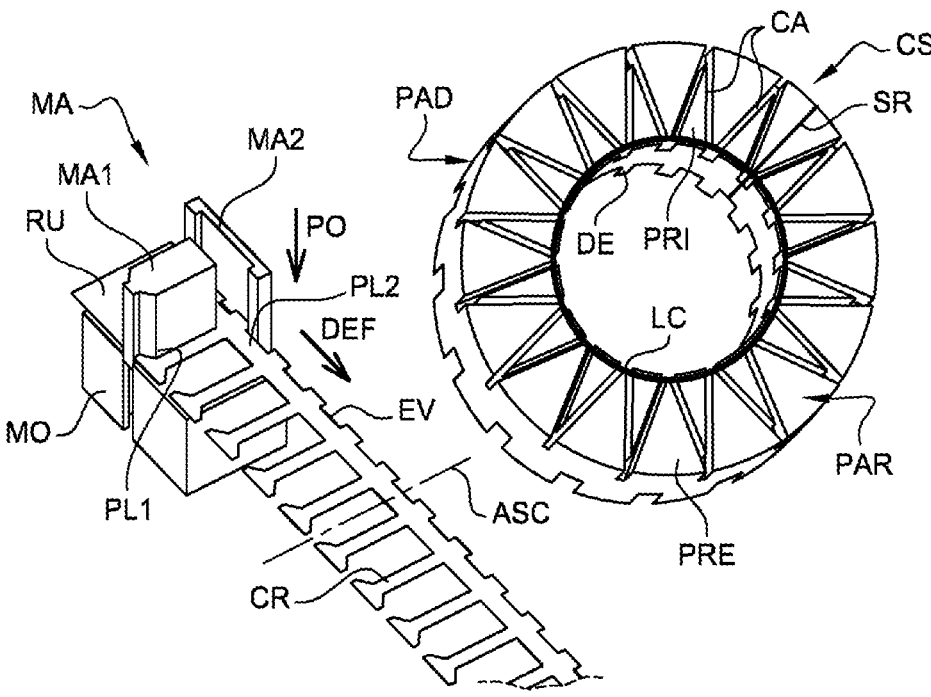
Figure 2C:
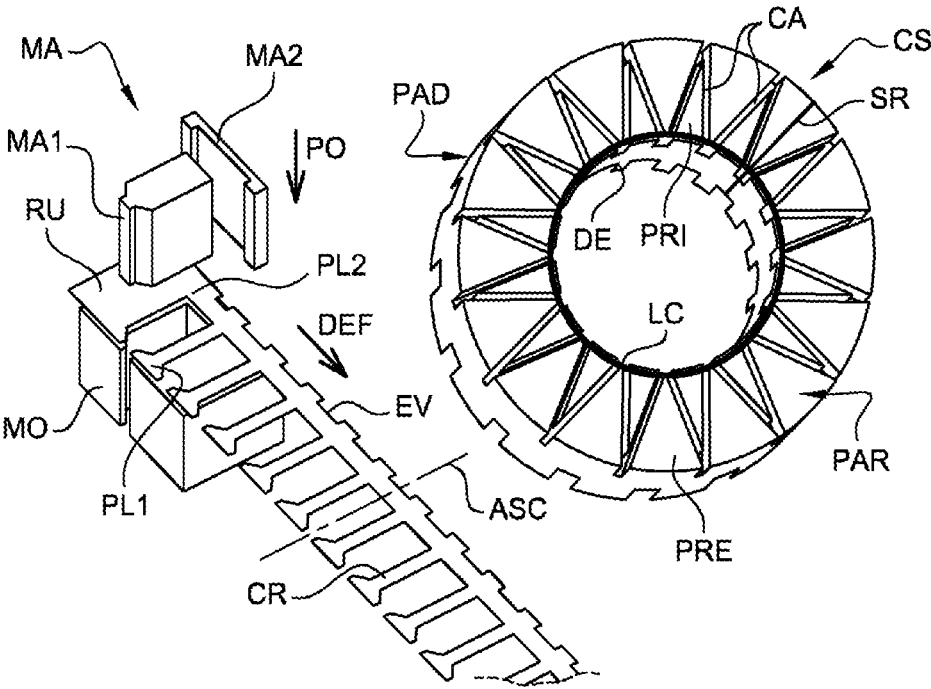
Figure 2D:
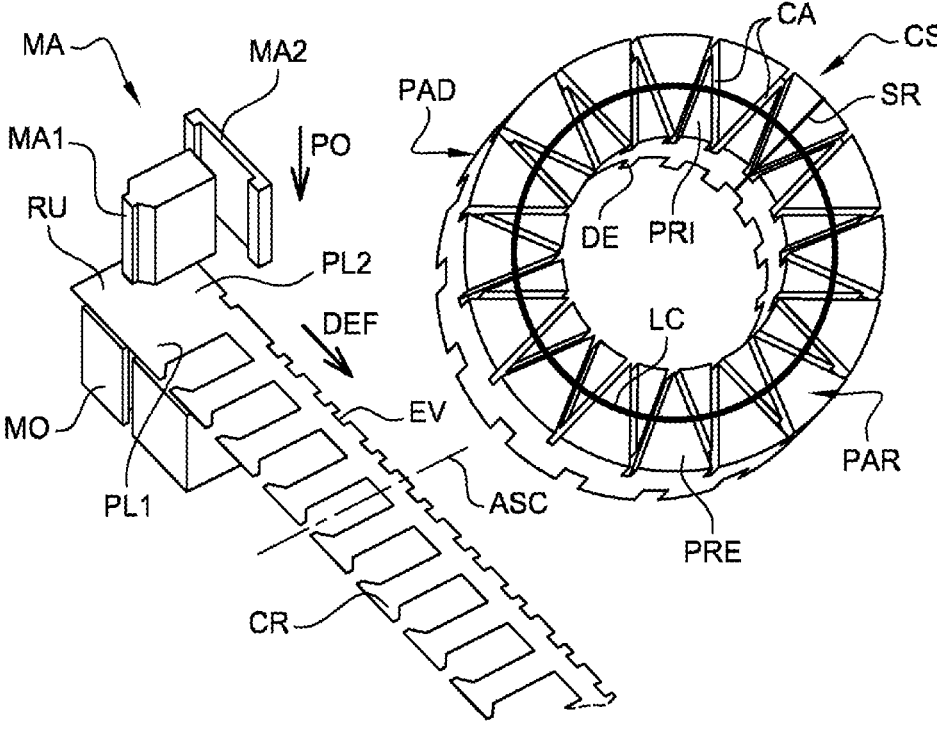
Figure 2E:
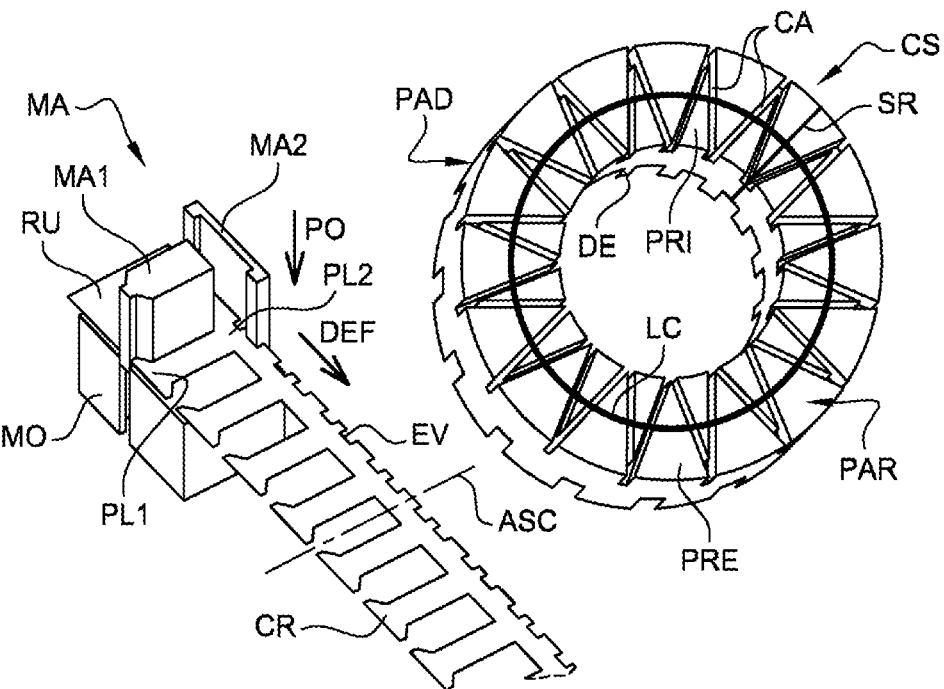
Figure 2F:
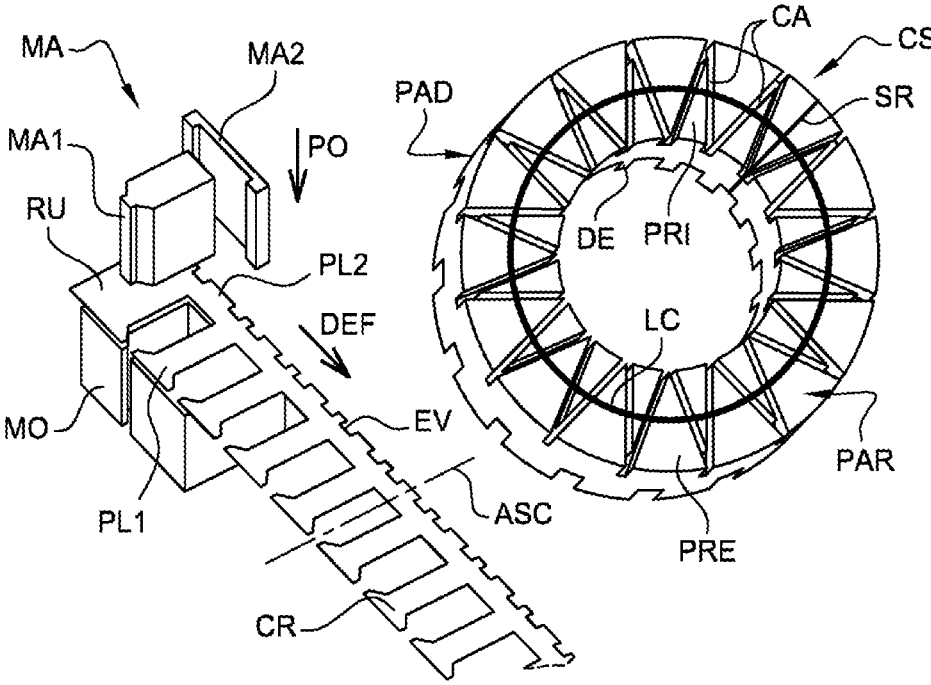
Figure 2G:
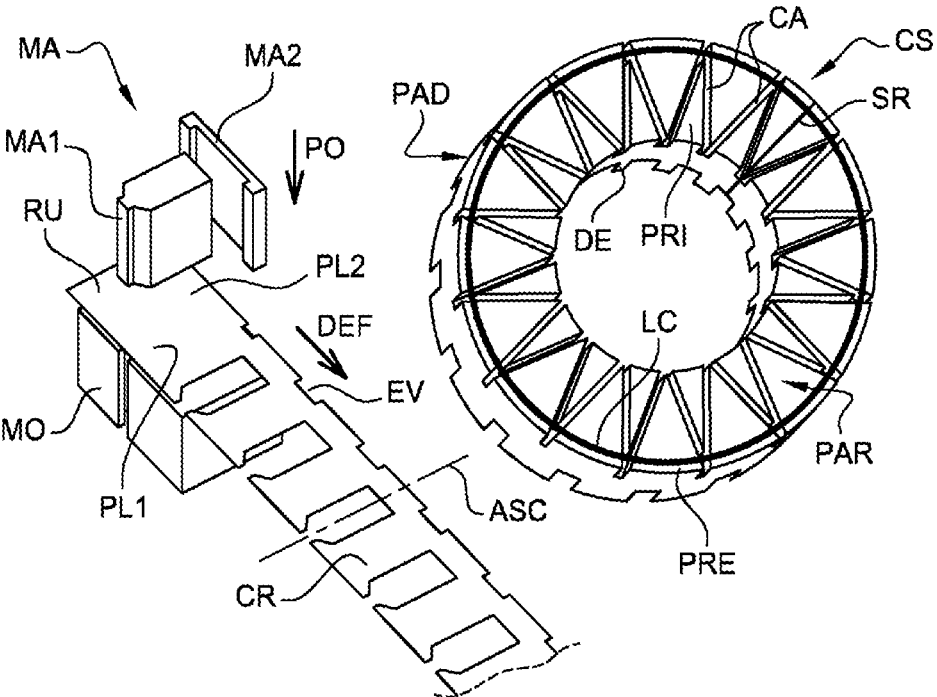
Figure 2H:
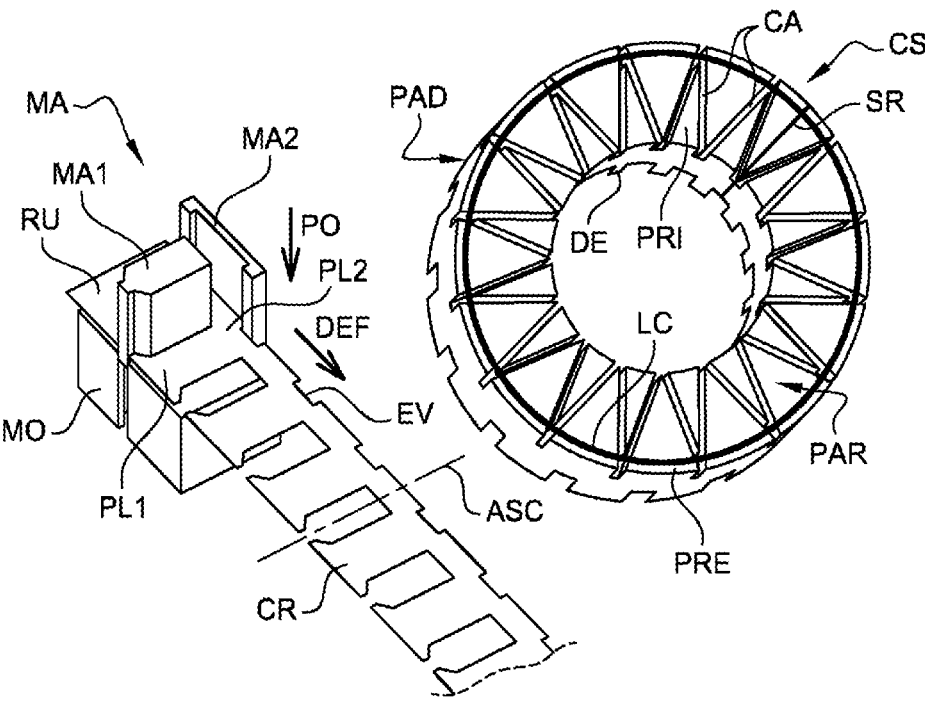
Figure 2I:
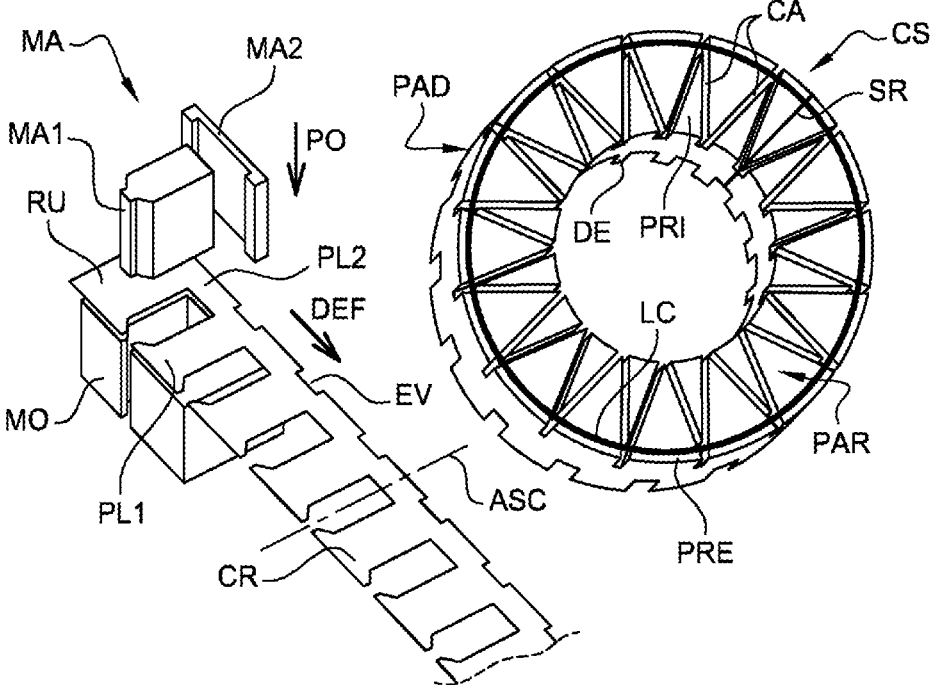
Figure 3:
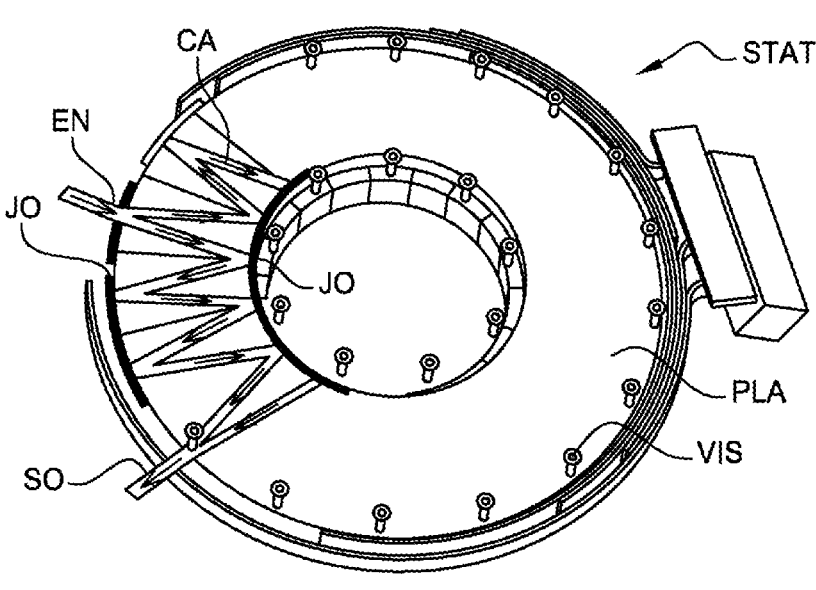
Figure 4:
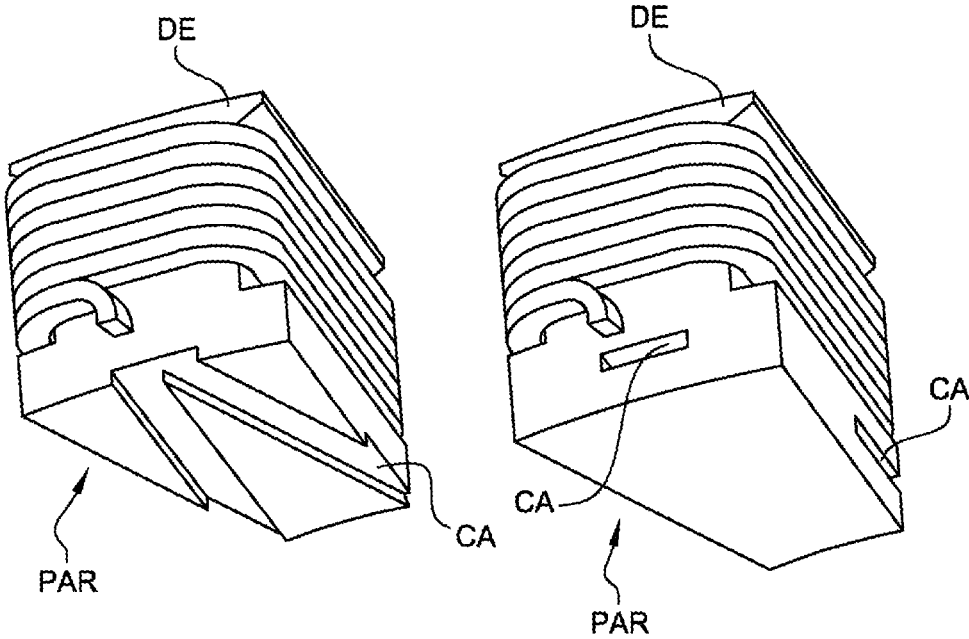
Figure 5:
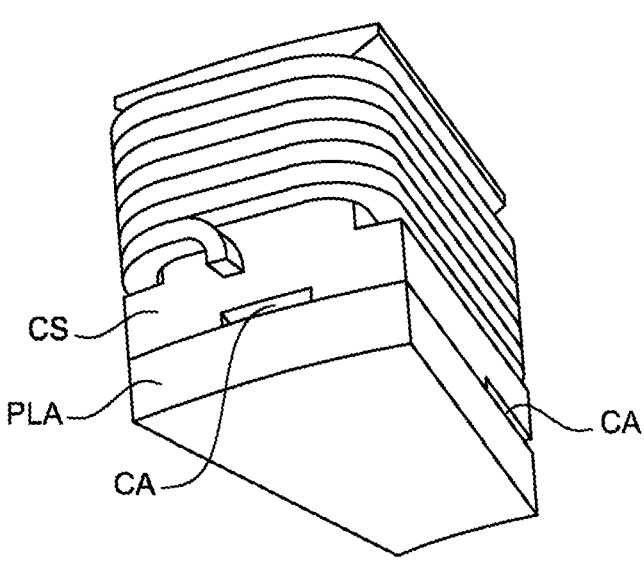

Further features and advantages will become apparent from studying a preferred embodiment described with reference to the figures, in which:

FIG. 1 shows steps of the manufacturing method according to the invention, in this preferred embodiment of the invention, FIG. 2a shows a perforation step of the manufacturing method according to the invention on the first part of a metal sheet strip forming the internal radial periphery of a stator yoke being manufactured, just prior to the actuation of a mandrel, in this preferred embodiment of the invention, FIG. 2*b* shows the perforation step of FIG. 2*a*, at a subsequent instant which is the actuation of the mandrel, FIG. 2*c* shows the perforation step of FIG. 2*b*, at a subsequent instant which is the disengagement of the mandrel, FIG. 2*d* shows said perforation step on a second part of the metal sheet strip forming an internal annular portion of the stator yoke being manufactured, just prior to the actuation of a mandrel, FIG. 2*e* shows the perforation step of FIG. 2*d*, at a subsequent instant which is the actuation of the mandrel, FIG. 2*f* shows the perforation step of FIG. 2*e*, at a subsequent instant which is the disengagement of the mandrel, FIG. 2*g* shows said perforation step on a last part of the metal sheet strip forming the external radial periphery of the stator yoke being manufactured, just prior to the actuation of a mandrel, FIG. 2*h* shows the perforation step of FIG. 2*g*, at a subsequent instant which is the actuation of the mandrel, FIG. 2*i* shows the perforation step of FIG. 2*h*, at a subsequent instant which is the disengagement of the mandrel, FIG. 3 shows a stator manufactured according to the invention, in this preferred embodiment of the invention, FIG. 4 shows two portions of a yoke of a stator manufactured according to two different embodiment variants of the invention, and FIG. 5 shows a yoke portion and a closure plate portion of a stator manufactured according to the preferred embodiment of the invention.

According to a preferred embodiment of the invention shown in FIG. 1, the method for manufacturing a stator for an axial flux electric machine according to the invention comprises steps E1 to E4.

Step E1, shown in FIGS. 2*a* to 2*i*, is the perforation of a magnetic metal sheet strip RU. The strip RU is for example, but not necessarily, made of grain oriented steel. In the latter case, the grains are preferably oriented in the winding direction of the metal sheet so as to guide the magnetic flux in the stator yoke CS in the angular direction during operation of the electric machine. It should be noted that the step of winding the metal sheet to form the stator yoke of the stator will be described further below.

This perforation step E1 comprises two sub-steps that are carried out simultaneously:

a sub-step E11 of cutting slots CR which will form the teeth DE of the stator yoke CS, and a sub-step E12 of cutting recesses EV which will form cooling channels CA at the axial periphery PAR of the stator yoke CS that is opposite to the toothed axial periphery PAD of the stator yoke CS.

Step E1 uses a mold MO on which the strip RU travels in the direction of travel DEF, and a mandrel MA which is actuated at regular time intervals against the strip RU in the perforation direction PO. The mandrel MA comprises a first part MA1 which cuts the slots CR on a first lateral part PL1 of the strip RU, and a second part MA2 which cuts recesses on a lateral part PL2 of the strip RU that is opposite to the lateral part PL1 of the strip RU.

More specifically, the second part MA2 of the mandrel comprises two punches that are distributed symmetrically spaced apart from one another with respect to the longitudinal axis of axial symmetry of the first part MA1 of the mandrel. Thus, for each cut of material between two slots CR being formed, two recesses are created spaced apart from one another symmetrically with respect to the axis of axial symmetry ASC of these two slots relative to one another.

In FIGS. 2*a* to 2*c*, it is possible to see the cutting of the strip RU at the level of what constitutes, after winding, the internal periphery of the stator yoke CS, marked by the circular line LC. In these figures, the perforation step produces, in one application of the mandrel MA, a recess wider than the width of a punch of the second part MA2 of the mandrel, by overlapping with a recess that was previously produced during this perforation step, and a recess having the width of a punch of the second part MA2 of the mandrel. Specifically, since the width of the stator teeth DE is narrow at the internal periphery PRI of the stator yoke CS, with respect to the width thereof at the external periphery PRE of the stator yoke CS, the distance between the punches of the second part MA2 of the mandrel encompasses a width of several slots. These wide recesses correspond to the junction of two cooling channels CA at the internal periphery PRI of the stator yoke CS. These recesses are spaced apart symmetrically with respect to the radial section SR of the stator yoke CS passing through the axis of axial symmetry ASC.

During the cutting of the strip RU at the level of the metal sheet disposed radially in the center of the stator yoke CS, shown by the circular line LC in FIGS. 2*d* to 2*f*, the cut slots are wider than in FIGS. 2*a* to 2*c*. The perforation step produces, in one application of the mandrel MA, two recesses each having the width of a punch of the second part MA2 of the mandrel MA. These recesses correspond to two separate cooling channels CA which meet at the internal periphery PRI of the stator yoke CS.

During the cutting of the strip RU at the level of the metal sheet disposed at the external periphery of the stator yoke CS, shown by the circular line LC in FIGS. 2*g* to 2*i*, the cut slots are wider than in FIGS. 2*d* to 2*f*. The perforation step again produces, in one application of the mandrel MA, a recess wider than the width of a punch of the second part MA2 of the mandrel, by overlapping with a recess that was previously produced during this perforation step, and a recess having the width of a punch of the second part MA2 of the mandrel. These recesses correspond to two separate cooling channels CA which meet at the external periphery PRE of the stator yoke CS.

Step E2 is then the winding of the strip RU, the metal sheet of the strip RU being stacked radially on itself during this step, so as to form the stator yoke CS.

Step E3 is the axial closure of the cooling channels CA by placing an annular plate PLA on the axial periphery PAR of the stator yoke CS of the stator STAT which has been manufactured, as shown in FIG. 3. This plate PLA is, for example, screwed by screws VIS to the stator yoke CS. In this FIG. 3, the channels CA have been schematically shown as they would appear if the plate PLA were transparent, on a portion of the stator STAT.

Lastly, step E4 is the application of a seal JO to the internal PRI and external PRE radial peripheries of the stator STAT, so as to radially close the channels CA at their ends which do not serve as inlet EN or outlet SO for the oil circuit comprised in the stator yoke CS. These inlets and outlets are then connected to the pipes of a cooling circuit external to the stator STAT, comprising a heat exchanger.

It should be noted that the disposition of the channels CA at the axial periphery PAR of the stator yoke CS is in reality not dependent on the angular position of the teeth DE. In a variant, it is therefore possible for the recesses EV to be punched symmetrically on either side of a line that is parallel to the line of axial symmetry ASC but offset therefrom by any desired angular position.

FIG. 4 shows, on the left, a portion of the stator yoke CS, corresponding to a stator tooth, in the main embodiment variant of the invention. In this main variant of the invention, the ends of the channels CA open out radially. In a variant, it is of course possible to produce the channels CA in such a way as to not open out. The sealing of the channels CA inside the stator yoke is ensured for example by varnish, adhesive or paint. This sealing does not have to be perfect since oil is generally used as coolant, the important point being that the flow of liquid is mostly correctly guided in the channels CA.

Shown on the right in FIG. 4 is an embodiment variant of the invention in which the channels CA are axially closed in the stator yoke CS. To implement this variant, the punches of the second part MA2 of the mandrel MA produce holes in the second lateral part PL2 of the strip RU, said holes not opening out toward the outside of the strip RU.

Lastly, FIG. 5 shows a portion of the stator yoke CS, corresponding to a stator tooth DE, in the main embodiment variant of the invention, and also the corresponding portion of the plate PLA, which is screwed or adhesively bonded to the stator yoke CS. It is of course possible to manufacture the stator yoke CS in a segmented manner, by stacking cut metal sheets for each stator tooth portion, but this manufacturing operation affords far fewer advantages than the metal sheet winding method used in the invention.

The invention claimed is:

1. A method for manufacturing a stator for an axial flux electric machine, comprising:
   perforating a magnetic metal sheet strip, said perforating comprising:
      cutting material on a first lateral part of the strip, leaving slots on said strip that are configured to form stator teeth, and
      cutting recesses on a second lateral part of the strip, opposite to said first lateral part of the strip, that are configured to form coolant circulation channels; and
   winding said metal sheet strip according to a radial stack, wherein during the cutting of material between two slots of said strip, the cutting of the recesses is effected by a double perforation symmetrically with respect to a line parallel to an axis of axial symmetry comprised between said two slots, the recesses being cut so as to be positioned on either side of the radial section of the wound stator passing through said line, so as to be spaced apart from one another from a first radial peripheral part of said stator until the recesses meet on said radial section at the second radial peripheral part of said stator that is opposite to said first radial peripheral part, thus forming said channels, said channels being in the form of a V and meeting at ends of branches of the V during said winding.

2. The method for manufacturing the stator for the axial flux electric machine as claimed in claim 1, wherein said channels are open, at the branches of the V and/or at a point of the V, on said first or said second radial peripheral part of said stator.

3. The method for manufacturing the stator for the axial flux electric machine as claimed in claim 2, further comprising:
   applying a seal to said first radial peripheral part and/or to said second radial peripheral part of the stator, at openings of said channels that do not serve as an inlet or an outlet for said coolant.

4. The method for manufacturing the stator for the axial flux electric machine as claimed in claim 1, wherein said first radial peripheral part of said stator is an internal peripheral part of said stator, said second radial peripheral part of said stator being an external peripheral part of said stator.

5. The method for manufacturing the stator for the axial flux electric machine as claimed in claim 1, wherein said parallel line corresponds to the axis of axial symmetry comprised between said two slots.

6. The method for manufacturing the stator for the axial flux electric machine as claimed in claim 1, wherein said recesses open out at an axial periphery of said stator, said method further comprising closing said channels at said axial periphery by fastening an annular plate to said axial periphery.

7. A stator manufactured by the method for manufacturing the stator for the axial flux electric machine as claimed in claim 1.

* * * * *